United States Patent [19]

Moore

[11] Patent Number: 4,969,947

[45] Date of Patent: Nov. 13, 1990

[54] ONE-STEP METHOD OF COATING NUTRIENT PARTICLES

[75] Inventor: William P. Moore, Hopewell, Va.

[73] Assignee: Melamine Chemicals, Inc., Donaldsonville, La.

[21] Appl. No.: 180,831

[22] Filed: Apr. 12, 1988

[51] Int. Cl.$^5$ .......................... C05C 9/00; C05C 13/00
[52] U.S. Cl. ............................................ 71/28; 71/29; 71/30; 71/64.11; 71/64.12
[58] Field of Search .................................. 71/1, 28–30, 71/64.11–64.13, 93

[56] References Cited

U.S. PATENT DOCUMENTS 4,804,403  2/1989  Moore ..................................... 71/28

Primary Examiner—Ferris H. Lander
Attorney, Agent, or Firm—A. W. Breiner

[57] ABSTRACT

A one-step method of preparing coated particulate plant nutrients wherein a polyfunctional coupling agent is applied to a mobile mass of plant nutrient particles containing functional groups which are chemically reactive with the functional groups of the coupling agent, while simultaneously applying a second reactive material containing functional groups also reactive with the functional groups of the coupling agent, maintaining the mobile mass at a temperature between 30° C. and 300° C. until a strong, water-insoluble particle. The product of the one-step method is a controlled-release plant nutrient having excellent attrition resistance.

27 Claims, No Drawings

ONE-STEP METHOD OF COATING NUTRIENT PARTICLES

RELATED APPLICATIONS

This application relates to my U.S. Pat. No. 4,711,659 issued Dec. 8, 1987; a co-pending application U.S. Ser. No. 082,236 filed Aug. 6, 1987 now U.S. Pat. No. 4,804,403, issued Feb. 14, 1989.

FIELD OF INVENTION

This invention relates to granular water-soluble plant nutrients for controlled release. More particularly, the invention relates to an improved method of preparing attrition-resistant, coated plant nutrient particles wherein a water-soluble plant nutrient compound in particulate form containing reactive functional groups, a coupling agent component having reactive functionality, and a second reactive material are reacted substantially simultaneously to form a strong water-insoluble polymeric coating to protect the plant nutrient particles. The components are selected in order that the reactive functionality of the coupling agent will react with the functionality on both the plant nutrient particles and the second reactive material. The ratios of the components are selected in order that the coupling agent is present in an amount sufficient to provide reactive sites for reaction with the reactive functionality at the surface of the plant nutrient particles and with the reactive functionality of the second reactive material to form particles of the water-soluble plant nutrients having a substantially homogeneous coating, with the second reactive material being chemically linked to the plant nutrient particles by the coupling agent.

Preferably the method of preparing attrition-resistant, coated particulate plant nutrients comprises reacting amino groups at the surface of water-soluble plant food particles with a polyisocyanate coupling agent and at the same time reacting the polyisocyanate with an organic polyol as a second reactive material to form a substantially homogeneous water-insoluble polymer coating chemically bonded to the original water-soluble food particles.

DESCRIPTION OF THE PRIOR ART

Rapid release of water-soluble plant nutrients in soils may cause phytotoxicity to the plants, and/or the early depletion of the plant nutrients by leaching. Researchers for a long time have attempted to develop particles which release nutrients at a rate about equal to their uptake by plants to minimize phytotoxicity and maximize use efficiency. Improved release control has been achieved primarily with nitrogen in the form of urea by substantially reacting it with aldehydes to form insoluble products such as ureaform, which must chemically decompose in the soil before the nitrogen becomes available for utilization by plants. Another method consists of physically coating fertilizer granules with solidified water-insoluble melts. Various materials have been used as coatings, including sulfur, paraffin waxes and plastics. These coatings must be broken down by erosion, internal vapor pressure, microbes, or attrition before the contained nutrients become available.

Unfortunately, attrition in producing storing, handling, and applying the coated products prematurely breaks down the coatings causing substantial loss of release control, phytotoxic problems, and excessive nutrient leaching. These problems and other disadvantages associated with these coated products cause the nitrogen not to be available for plant uptake in a reasonable time period, or cause the nitrogen release rate to still be so high as to cause phytotoxic problems when substantial amounts of the nutrients are applied. Additionally, since there is no direct chemical bonding between the plant food and the coating material, the release rate of the plant food is not rigidly controlled as a result of cracking of the coatings or the like, leading to the uncontrolled release of the plant food.

Although many efforts have been made heretofore to provide improved coating techniques so as to accurately control the release rate of the plant food, it has not been possible to provide a material free from the above-noted shortcomings. It has long been an object of those skilled in the art, therefore, to produce controlled-release fertilizers having substantial resistance to attrition from shipping, handling, and application by applying economically small amounts of coating material to the fertilizers and wherein the rate of fertilizer release is consistently controlled.

Many of these shortcomings in the prior art were overcome in my co-pending application U.S. Ser. No. 082,236 filed Aug. 6, 1987, which discloses an attrition-resistant, controlled-release fertilizer comprising a water-soluble central mass containing nucleophilic reactive functional groups surrounded and chemically bonded to a base coating formed by reacting a coupling agent with the nucleophilic groups of the central mass and with the functional groups of a material which will form, by reaction with the coupling agent, a water-insoluble layer. My U.S. Pat. No. 4,711,659 also teaches such a coating system wherein $NH_2$-containing water-soluble central particles such as urea are surrounded and chemically bonded with a base coating formed by reacting a polyfunctional isocyanate with the $NH_2$ groups of the central particles and a water-insoluble layer surrounding and chemically bonded with the base coating. These teachings provided controlled-release nutrients which have substantial resistance to attrition from shipping, handling, and application with small amounts of coating materials. The methods described in my aforesaid application and patent, the disclosures thereof being incorporated herein by reference, apply the coating materials in a plurality of steps. The present invention now provides a simplified process for preparing the controlled-release fertilizer of the aforesaid application and patent.

PRIMARY OBJECTS OF THE INVENTION

It is, therefore, a primary object of this invention to provide a new and improved method for coating water-soluble particulate plant nutrients so that the plant nutrients are resistant to attrition and are released in a slow and controlled manner.

It is another primary object of this invention to provide an improved and simplified method of coating soluble fertilizer particles with a substantially homogeneous coating chemically bonded to the soluble fertilizer particles.

It is another primary object of this invention to provide an improved and simplified method of coating soluble plant nutrient particles with coatings so securely bonded that little or no attrition occurs, and release control is maintained even when the coated particles receive severe vibration and abrasion.

It is a further primary object of this invention to provide an effective attrition-resistant, controlled-release coated plant nutrient product prepared by the presently described improved method.

SUMMARY OF THE INVENTION

The present invention provides an improved and simplified method of preparing coated particulate plant nutrients which exhibit remarkably high resistances to attrition. The improved method is based on the discovery that when a chemically reactive polyfunctional coupling agent in fluid form is applied to particulate nutrients simultaneously with a second reactive material, which is in fluid form, with the nutrient, coupling agent, and second reactive material being carefully selected and reaction conditions closely controlled, a strong substantially homogeneous water-insoluble coating is formed which is chemically bonded to the particulate nutrient, thereby protecting the nutrient from attrition and premature dissolution in water and soil.

In a preferred embodiment of the improved method, a polyfunctional coupling agent is applied to a mobile mass of plant nutrient particles which contains at least 10 percent of functional groups which are chemically reactive with the functional groups of the coupling agent. At about the same time a second reactive material containing functional groups reactive with the functional groups of the coupling agent is applied to the same mobile mass of nutrient particles in a manner to provide mixing with the coupling agent and to form a substantially homogeneous coating on the plant nutrient particles. In this coating method, the functional groups of the second reactive material and the coupling agent are applied in a ratio between 1 and 3, with a part of the coupling agent being required to chemically bond the coating with the reactive functional groups near the surface of the plant nutrient particles. The coated plant nutrient particles are held as a mobile mass at a temperature of between 30° C. and 200° C. until the polyfunctional coupling agent chemically bonds with the reactive functional groups at the surface of the particulate plant nutrients, and reacts with the functional groups of the second reactive material to form a strong, substantially homogeneous, water-insoluble coating It is surprising that this essentially one-step method produces the desired product in substantially theoretical yield. It was believed the simultaneous mixing of the coupling agent with the two reactive components would provide a mixture of products. Apparently, however, this does not occur because the plant nutrient is in particulate form, whereas the second reactive component and coupling agent are in fluid, preferably liquid, form.

DETAILED DESCRIPTION OF THE INVENTION

The improved method of producing attrition-resistant controlled release coated particulate plant nutrients starts by initiating a mobile mass of plant food particles which comprises a chemical compound, or compounds, normally used for plant nutrition. It has been found that the particles must contain at least about 10 percent reactive functional groups, such as nucleophilic groups, which are chemically reactive with the functional groups of a coupling agent, to provide the reaction sites for chemically bonding at the particle surface with the coupling agent. These plant nutrients can be any of the various materials having plant food values such as urea, ammonium salts, ureaform, melamine, potassium salts, phosphate salts, and sulfur materials. It is only essential that the material selected have reactive functionality available at the surface of the particle for reaction with the coupling agent. Particularly useful materials include plant nutrients containing amine ($NH_2$) functionality such as urea, substituted ureas, including ureaform, and alkylurea, biurets, guanidine, melamine, amino acids, proteins, methylolureas, alkanolamines, and ammonia; compounds having hydroxyl (OH) functionality and plant food value, such as nitrogen-containing polyols; and the plant food materials monoammonium phosphate, diammonium phosphate, ammonium polyphosphate, monopotassium phosphate, dipotassium phosphate, potassium bicarbonate, ammonium sulfate, and potassium bisulfate. Plant nutrient materials containing carboxyl functionalities such as potassium formate, potassium acetate, potassium diacetate and elemental sulfur can also be used. Although reactive functionality, such as nucleophilic groups, must be present in an amount of at least about 10 percent to provide the necessary reaction sites, the percent of functionality is preferably in the range of 23 to 55 percent.

The plant food particles used in the method of this invention may be in a variety of commonly available physical shapes. Those shapes having the highest degrees of regularity and the lowest surface areas per unit of weight can be effectively coated with the lowest amount of materials. Physical shapes of the plant nutrient particles which may be effectively coated by the instant method include granules, prills, pellets, extrusions, shots, lumps, grains, and crystals.

The method of this invention can be carried out effectively by creating a mobile mass of the particulate plant nutrients in a variety of devices including rotary drums, fluid beds, rotary pans, falling film contactors, conical blenders, and agitated conveyors. These devices provide mobility of the nutrient particles, which preferably includes a rolling movement of the particles, and also provide a nearly simultaneous application of a liquid polyfunctional coupling agent and a second reactive material so the two materials mix near or on the surface of the particles. Simultaneous spraying of the coupling agent and the second reactive material so that they quickly mix is the preferred method of application.

The coupling agent contacts the surface of the particulate plant nutrient and at about the same time mixes with the second reactive material to form a substantially homogeneous coating on the nutrient. The mobile mass of particles is held at a temperature between 30° C. and 200° C. until the polyfunctional coupling agent has chemically bonded with the reactive functional groups at the surface of the nutrient particles and has reacted with the functional groups of the second reactive material to form a strong, substantially homogeneous, water-insoluble coating.

The coupling agent can be any material having at least two functional groups available for coupling and includes compounds, low molecular weight polymers, and the like. The available functionality must be selected so that it will react with the reactive functionality, such as nucleophilic group on the nutrient particles, and also with the functionality of the second reactive material with which the coupling agent is mixed to form a strong, water-insoluble coating. Materials which can be used, depending upon the functionality on the nutrient particles and the second reactive material, usually contain electrophilic functional groups. Between about 10 and 35 percent of these groups are required to provide adequate bonding with the nutrient particles and with the second reactive material to provide the water-insoluble coating. Polyfunctional isocyanates, as illustrated by diphenylmethane diisocyanate, triphenylmethane triisocyanate, and hexane diisocyanate; a polycarboxylic acid compound, as illustrated by terephthalic acid, methyl terephthalate, and maleic anhydride; as well as amine-substituted carboxylic compounds, are materials which may be effectively used as the coupling agent.

The amount of polyfunctional coupling agent used in the method of this invention must be sufficient to provide chemical reaction and bonding with the surface of the plant nutrient particles and to react with the second reactive material to form the water-insoluble coating, but must not be so excessive that the mass of granules sticks and cannot be kept in mobile condition. Beyond these constraints the amount of coupling agent may be varied considerably depending upon the properties desired in the coated product. As presently determined, best operation of the method occurs when the polyfunctional coupling agent is present in an amount between about 0.1 and 3.0 percent by weight of the plant nutrient particles. When heavy coatings on the nutrient particles are desired, it is usually better to use a plurality of coating operations rather than exceed 3 percent of coupling agent in a single coating.

For the above reason, the amount of the second reactive material applied while mixing the coupling agent to form the homogeneous coating is best controlled between 0.1 and 9.0 percent by weight of the particles. The strong, water-isoluble coating which chemically bonds to the plant nutrient particles is formed by the reaction and polymerization of the reactive groups of the polyfunctional coupling agent with a sufficient amount of the functional groups of a second reactive material. These usually are nucleophilic functional groups and the second reactive material was found to require concentrations of between 10 and 55 percent of the functional groups to provide sufficient reactivity to form an effective nutrient particle coating strength.

In the event the coupling agent is a polyisocyanate, a preferred second reactive material includes the anhydrous polyamines such as hexamethylene diamine and hexamethylene tetramine; anhydrous polyols such as glycerine, diethylene and dipropylene glycols; triethylene and tripropylene glycols, and butanediol. By-products from the polymer industry such as aliphatic and aromatic polyethers or polyester compounds terminating in a plurality of hydroxyl functional groups can also be economically used as second reactive materials. Anhydrous polyols are preferred.

To provide varied properties in the coating applied to the nutrient particles in the method of this invention, the second reactive material may comprise a blend of two or more materials so long as the blend provides the necessary functional groups.

It has been found that the method of this invention can be improved when a catalyst is used to enhance the chemical reaction. The catalyst may be premixed with the second reactive material and introduced to the reaction zone with the reactive material, or it can be supplied as a separate component. A convenient and preferred way of introducing the catalyst is as a part of the second reactive material. The amounts of catalyst desirably used in this method depend to a large degree on the materials used and the product properties desired. It has been found that the catalyst amount is effective when applied at concentrations between 1 and 30 percent in relation to the second reactive material. Catalysts which are especially effective when the coupling agent is a polyfunctional diisocyanate, and the second reactive material is an organic polyol are triethanolamine, triethylamine, ammonia, tin isooctoate, and tributyl tin.

It has also been found that it is possible to include substantial amounts of diluent fillers in the water-insoluble coatings. To allow ease in operating, it is preferred to blend the filler material with the second reactive material before the coating method is carried out. Inert powders such as clay, diatomaceous earth, lime, magnesia, iron, zinc and manganese, and viscous liquids such as tars and resins may be used as diluent fillers to reduce the consumption of the coupling agent and second reactive materials while retaining the resistance to attrition and controlled nutrient release.

The mobile mass of plant nutrients is preferably maintained at a temperature range of between 85° C. and 115° C. In this temperature range the coupling agent has sufficient time to react to form a strong chemical bond at the surface of the plant nutrient particles before the coupling agent is completely reacted with the second reactive material. The time required to effectively complete the coating method in this temperature range is between about one and 15 minutes.

The method of this invention can be carried out batchwise or continuously. When the method is carried out in a continuous manner, the coupling agents and the second reactive materials are added continuously through separate feed systems, and the coated nutrients are continuously withdrawn. To provide homogeneity of the coated particles produced in continuous operation of the instant method, the use of a coating device is preferred which restricts the back mixing of coated particles with uncoated nutrient particles. A rotary drum was found to work satisfactorily as a coating device. When this device is used in a continuous manner, it is preferred to provide internal dams in the drum to restrict backmixing of the granules. Further, it is preferred that the coupling agents and the second reactive materials be applied almost simultaneously by spraying onto the particles through multiple addition points from separate supply systems.

Although this invention is primarily directed to a method for coating particles, it is believed that the disclosed method produces coated particulate plant nutrient particles which are particularly resistant to attrition.

In a preferred embodiment of the aforementioned one-step method, polymeric diphenylmethane diisocyanate containing between 15 and 31 percent isocyanate groups (NCO) is sprayed, as a polyfunctional coupling agent, in an amount of between 0.3 and 2.0 percent, onto a mobile mass of nitrogen fertilizer particles in the size range indicated by U.S. Mesh sizes between 4 and 30 and containing between 10 and 53 percent reactive amine functional groups. Simultaneously, onto the same mobile mass of fertilizer particles is sprayed, and mixed with the coupling agent, between 1.0 and 1.5 parts of anhydrous organic polyol per part of coupling agent. This second reactive material is effective when it contains between 5 and 55 percent hydroxyl groups as the functional groups which are reactive with the functional groups of the coupling agent. A catalyst amounting to between 5 and 15 percent triethanolamine is included in the second reactive material to enhance the reactivity of the coupling agent and the second reactive material. The two materials when sprayed onto the surface of the particulate nitrogen fertilizer granules form a substantially homogeneous coating thereon.

To expeditiously complete the preferred method, the mobile mass of particles is held at a temperature of between 85° C. and 115° C. for a period of time between two and 10 minutes until the diphenylmethane diisocyanate has chemically bonded with the amine functional groups at the surface of the nitrogen fertilizer particles and polymerized with the hydroxyl groups on the second reactive material to form a strong, water-insoluble coating sufficient to control nitrogen release from the fertilizer particles when they are eventually placed in soil. In another preferred embodiment, organic polyamines containing between 5 and 54 percent amine ($NH_2$) groups can be substituted for the organic polyols in the above-described preferred method.

The products produced by the aforementioned preferred method are unique and have an especially high resistance to attrition, and effectively and evenly release nitrogen into the soil over an extended period of time.

In the aforesaid disclosure it is to be understood that the term "polyfunctional isocyanate" is used to define aliphatic, aromatic, and aliphatic-aromatic polyisocyanate compounds generally known as polyisocyanates. These compounds contain two or more NCO groups available for reaction, and are widely used in the production of polyurethane polymers.

The term "organic polyol" is used to define organic compounds containing two or more OH groups located on an aliphatic or aromatic carbon skeleton. Because of the nucleophilic nature of the OH groups, these compounds may be readily reacted and polymerized with the electrophilic polyfunctional isocyanates. The organic polyols used in the instant invention must be substantially anhydrous when the coupling agent is a polyisocyanate. Any water present reacts with the isocyanates to produce carbon dioxide gas, thereby blowing perforations through the coating. The term "organic polyamine" has a similar meaning except that $NH_2$ groups are substituted for the OH groups.

The critical feature of this method, as stated hereinbefore, is the one-step application to particulate plant nutrients of a coupling agent which will react with the nutrients to form a chemical bond, and with a simultaneously applied second reactive material to form a substantially homogeneous, water-insoluble coating.

PRESENTLY PREFERRED MODES OF OPERATION OF THE INVENTION

Having described the basic concepts of the instant invention, reference is now made to the following examples which illustrate the presently preferred embodiments of the invention.

EXAMPLE 1

4000 grams of $-4 +6$ U.S. Mesh granular urea particles containing 52 percent $NH_2$ groups were added to a laboratory rotary drum coater, 24 inches in diameter, 10 inches long, and fitted with fifteen slanted lifts to induce particle rolling. Rotation of the drum at 30 rpm was initiated. 80 grams (2 percent) of a coupling agent consisting of liquid polymeric diphenylmethane diisocyanate containing 30 percent isocyanate (NCO) groups and consisting of 50 percent diphenylmethane diisocyanate (MDI) and 50 percent higher oligomers of MDI at 110° C. was sprayed onto the surfaces of the mobile mass of urea particles in the drum coater. 120 grams (3 percent)qqf a triethylene glycol and triethanolamine mixture containing 10% triethanolamine were sprayed onto the same mobile mass so that it mixed about completely with the coupling agent. The temperature of the mobile mass was maintained between 110° C. and 115° C. for a period of two minutes. A strong, water-insoluble chemically bonded coating was formed on the urea surface. The coated product was discharged from the coater and cooled to ambient temperature.

Examination of the coated urea product with a 200 power microscope showed the water-insoluble coating to be continuous, smooth, and completely attached to the urea granule with no visible holes, bubbles, or cracks.

EXAMPLE 2

Samples amounting to 500 grams of the product of Example 1 were tested for attrition resistance. The samples were placed in a 6-inch diameter by 8-inch long porcelain laboratory ball mill containing 40 steel balls, about one centimeter in diameter, and allowed to roll for 20 minutes at 100 rpm, providing a high degree of abrasion and impact. At the end of the test period, the sample were removed and attrition was measured by screening in a vibratory shaker for five minutes. No appreciable amounts of fines were produced from the samples of Example 1. Under the same test conditions, fines from commercial sulfur-coated urea amounted to 8.1 percent.

EXAMPLE 3

Example 1 was repeated using, as the particulate plant nutrient, $-6 +14$ U.S. Mesh particles of co-granulated urea and melamine containing 45 percent melamine and 55 percent urea. The amounts of coupling agent and second reactive material which were sprayed onto plant nutrient were adjusted to provide a total coating of 8.0 percent. Microscopic inspection of the coating showed it to be completely sealed around and to the plant nutrient granules. Samples of the product were tested for water-dissolution rate as an indication of its controlled-release properties. The tests were carried out by placing 25 grams of the granules in 100 grams of water at 100° F. and storing in a quiet closed bottle. After 7 days the amount of urea dissolved from the granules by the water was measured to be 15 percent, indicating that the fertilizer would release its nitrogen slowly over an extended period of time.

As will be apparent to one skilled in the art, various modifications can be made within the scope of the aforesaid description. Such modifications being within the ability of one skilled in the art form a part of the present invention and are embraced by the appended claims.

It is claimed:

1. A method for producing attrition-resistant coated particulate plant nutrients, comprising
   (a) applying a polyfunctional coupling agent to a mobile mass of plant nutrient particles which contain at least 10 percent of reactive functional groups which are chemically reactive with the functional groups of said coupling agent;
   (b) applying substantially simultaneously a second reactive material containing functional groups reactive with the functional groups of the coupling agent to the mobile mass of nutrient particles of (a); and
   (c) holding the mobile mass of plant nutrient particles at a temperature of between 30° C. and 200° C. unit the polyfunctional coupling agent chemically bonds with the reactive functional groups at the surface of the particulate plant nutrients, and also reacts with the functional groups of the second reactive material to form a strong, substantially homogeneous, water-insoluble coating.

2. The method of claim 1 wherein the polyfunctional coupling agent and the second reactive material are applied to a mobile mass of plant nutrient particles in a coating device selected from the group consisting of rotary drums, fluid beds, rotary pans, falling film contactors, conical blenders, and agitated conveyors.

3. The method of claim 1 wherein the plant nutrient particles are in a physical shape selected from the group consisting of granules, prills, pellets, extrusions, shots, lumps, grains, and crystals.

4. The method of claim 1 wherein the plant nutrient particles are fertilizers selected from the group consisting of urea, ammonium salts, ureaform, melamine, potassium salts, phosphate salts, and sulfur compounds.

5. The method of claim 1 wherein the plant nutrient particles contain between 23 and 55 percent nucleophilic functional groups.

6. The method of claim 1 wherein the reactive functional groups contained on the plant nutrient particles are selected from the group consisting of amine, hydroxyl, hydroxyamine, ammonia, sulfur, and carboxyl.

7. The method of claim 1 wherein the polyfunctional coupling agent contains between 10 and 35 percent electrophilic functional groups.

8. The method of claim 1 wherein the polyfunctional coupling agent is a polyfunctional isocyanate.

9. The method of claim 1 wherein the polyfunctional coupling agent is a polyfunctional carboxylic acid.

10. The method of claim 1 wherein the polyfunctional coupling agent is selected from the group consisting of diphenylmethane diisocyanate, hexane diisocyanate, triphenylmethane triisocyanate, maleic anhydride, terephthalic acid, and methyl terephthalate.

11. The method of claim 1 wherein the polyfunctional coupling agent is present in an amount between 0.1 and 3.0 percent by weight of the plant nutrient particles.

12. The method of claim 1 wherein the second reactive material is present in an amount between 0.1 and 9.0 percent by weight of the plant nutrient particles.

13. The method of claim 1 wherein the second reactive material contains between 10 and 55 percent nucleophilic functional groups.

14. The method of claim 1 wherein the second reactive material is an anhydrous organic polyol.

15. The method of claim 1 wherein the second reactive material is an anhydrous organic polyamine.

16. The method of claim 1 wherein the second reactive material is an aliphatic or aromatic polyether or polyester compound terminating in a plurality of hydroxyl functional groups.

17. The method of claim 1 wherein the second reactive material is selected from the group of materials consisting of glycerine, dialkylene glycol, trialkylene glycol, butanediol, hexamethylene diamine, and hexamethylene tetramine.

18. The method of claim 1 wherein the second reactive material contains between 1 and 30 percent of a catalyst.

19. The method of claim 18 wherein the catalyst is selected from the group consisting of triethanolamine, triethylamine, ammonia, tin isooctoate, iron isooctoate, and tributyl tin.

20. The method of claim 1 wherein the second reactive material is a blend of a plurality of materials providing the necessary functional groups.

21. The method of claim 1 wherein a diluent filler material is blended with the second reactive material before its application to the particulate plant nutrients.

22. The method of claim 21 wherein the inert material is selected from the group consisting of clay, diatomaceous earth, lime, magnesia, iron, zinc, tar, and resins.

23. The method of claim 1 wherein the coated mobile mass of plant nutrients is held at a temperature of between 85° C. and 115° C. for a period of time between one and 15 minutes.

24. The method of claim 1 wherein the coating steps are repeated to produce a plurality of coatings on the particulate plant nutrients.

25. The method of claim 1 wherein the method is performed in a continuous manner, the coupling agents and the second reactive material being applied at about the same time through separate systems while restricting back mixing of coated particles with uncoated nutrient particles.

26. A one-step method of producing attrition-resistant, controlled-release particulate nitrogen fertilizers, comprising
  (a) spraying polymeric diphenylmethane diisocyanate, containing between 15 and 31 percent NCO groups onto a mobile mass of nitrogen fertilizer particles exhibiting U.S. Mesh sizes between 4 and 30 and containing between 10 and 53 percent reactive amine functional groups;
  (b) simultaneously spraying and blending onto the mobile mass of fertilizer particles of (a) above, between 1.0 and 1.5 parts of an anhydrous organic polyol containing between 5 and 55 percent hydroxyl groups, and between 5 and 15 percent triethanolamine; and
  (c) holding the mobile mass of nitrogen fertilizer particles at a temperature of between 85° C. and 115° C. for a period of time between 2 and 10 minutes until the diphenylmethane diisocyanate has chemically bonded with the amine functional groups at the surface of the nitrogen fertilizer particles and polymerized with the hydroxyl groups in the second reactive material to form a strong, water-insoluble coating sufficient to control nitrogen release from the fertilizer particles.

27. The one-step method of claim 26 wherein the organic polyol is replaced with an anhydrous organic polyamine containing between 5 and 54 percent amine groups.

* * * * *